US009783147B2

(12) United States Patent
Spencer

(10) Patent No.: US 9,783,147 B2
(45) Date of Patent: Oct. 10, 2017

(54) DRIVER AIR BAG WITH SNAP-IN ATTACHMENT MECHANISM

(71) Applicant: Key Safety Systems, Inc., Sterling Heights, MI (US)

(72) Inventor: Byron Spencer, Bloomfield, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 15/236,412

(22) Filed: Aug. 13, 2016

(65) Prior Publication Data

US 2017/0050603 A1 Feb. 23, 2017

Related U.S. Application Data

(60) Provisional application No. 62/206,363, filed on Aug. 18, 2015.

(51) Int. Cl.
*B60R 21/203* (2006.01)

(52) U.S. Cl.
CPC ............................. *B60R 21/2035* (2013.01)

(58) Field of Classification Search
CPC ..................... B60R 21/203; B60R 21/2035
See application file for complete search history.

(56) References Cited

U.S. PATENT DOCUMENTS

| | | | | |
|---|---|---|---|---|
| 5,975,560 A * | 11/1999 | Fischer | ............... | B60R 21/2035 280/728.2 |
| 6,554,312 B2 * | 4/2003 | Sakane | ................ | B60Q 5/003 280/728.2 |
| 8,511,707 B2 * | 8/2013 | Amamori | ............ | B60R 21/2035 280/728.2 |
| 8,939,467 B2 * | 1/2015 | Zahn | ..................... | B60R 21/203 280/728.2 |
| 2004/0108690 A1 * | 6/2004 | Schutz | ................ | B60R 21/2037 280/728.2 |
| 2005/0110246 A1 * | 5/2005 | Schneider | ........... | B60R 21/2035 280/728.2 |
| 2007/0138770 A1 * | 6/2007 | Schuetz | .................. | B60R 21/20 280/728.2 |

(Continued)

FOREIGN PATENT DOCUMENTS

| | | | | |
|---|---|---|---|---|
| DE | 102009013802 A1 * | 9/2010 | ......... | B60R 21/2035 |
| JP | 05185891 A * | 7/1993 | ......... | B60R 21/2035 |
| JP | 2003312426 A * | 11/2003 | ......... | B60R 21/2035 |

*Primary Examiner* — Drew J Brown
(74) *Attorney, Agent, or Firm* — Markell Seitzman

(57) ABSTRACT

An assembly of a driver airbag module (102) and a steering wheel (104) having an airbag module including a housing (106) and a plurality of loop members (108) extending from the housing (106) and a steering wheel (104) having an armature (120) with a center or hub portion (122) onto which the airbag module (102) is attached. The armature (120) has hook members (110*a*, 110*b*, 110*c*), each hook member having a hook void (190). The hook void (190) is defined by a space above one or two base members (160*a*, 160*b*) and below a retaining member (180). The base member (160*a*, 160*b*) has a shallow ramped surface extending upwardly to an end wall and the retaining member (180) has a hook surface above the ramped surface and extending to the end wall. The loop member (108) is retained in the hook void (190) between the hook surface (186) and the ramped surface (168).

20 Claims, 7 Drawing Sheets

(56) References Cited

U.S. PATENT DOCUMENTS

2009/0315304 A1* 12/2009 Hagelgans .......... B60R 21/2035
  280/728.2
2016/0297390 A1* 10/2016 Raikar ................. B60Q 5/003
2017/0015267 A1*  1/2017 Ko ..................... B60R 21/2035

* cited by examiner

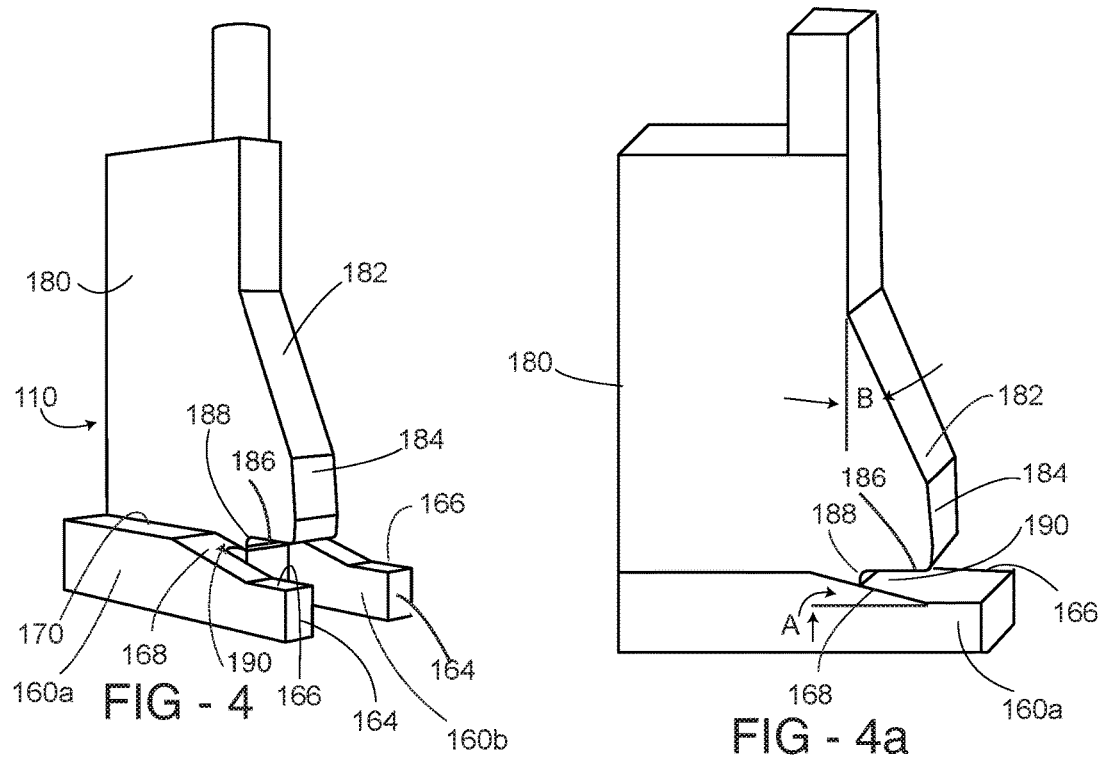
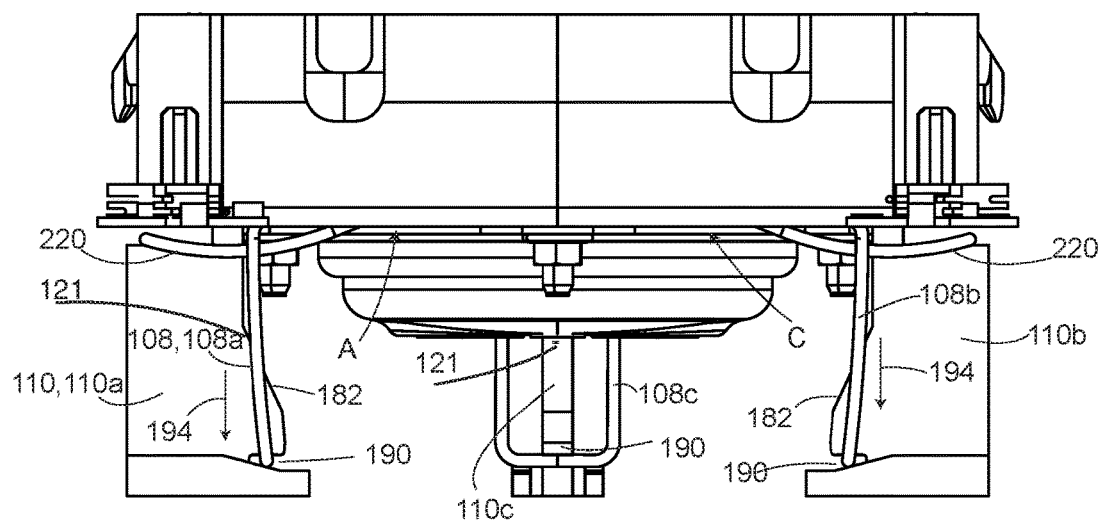

DRIVER AIR BAG WITH SNAP-IN ATTACHMENT MECHANISM

RELATED APPLICATIONS

The present invention claims priority to provisional U.S. application Ser. No. 62/206,363 filed Aug. 18, 2015.

TECHNICAL FIELD

The present invention relates in general to airbag modules and steering wheels and more particularly to a new assembly for attaching a driver airbag module to the steering wheel.

BACKGROUND AND SUMMARY OF THE INVENTION

Driver side airbag modules are designed to be attached to a center portion of a steering wheel armature. The armature or skeleton portion of the steering wheel includes two or more spokes which are attached to a circular rim. Often the rim and spokes are encapsulated with foam having an outer skin of polyurethane, simulating leather, or covered in leather. Optional wood or wood simulation can adorn the steering wheel. Typically incorporated into these steering wheels can be a variety of devices or switches that operate the cruise control or the horn or the radio, to name a few. Centered in the steering wheel is situated the airbag module for protecting the driver of the vehicle.

This driver side airbag module assembly is securely attached to the armature. It is often referred to as the DAB module (driver airbag module) assembly and it includes an inflator and an airbag cushion located inside a module housing which has an outer cover concealing the cushion. This outer cover often has a frangible tear seam that allows the inflating airbag to break the seam and deploy upon inflation. Often the entire DAB module includes or overlays one or more horn activation switches. To sound the horn, the driver pushes on the cover of the DAB module and the entire DAB assembly is moved inwardly, closing the contacts of the underlying horn activation switches, causing the horn to blow or sound.

To assemble the DAB module assembly to a steering wheel has been, at best, a challenge. Ideally, to insure a secure attachment that is reliable and rather simple to achieve, manufacturers have strived to develop snap-in driver side airbag modules. The goal has been to connect the airbag module electrically and then snap the entire assembly into locking engagement with the steering wheel. Once attached, these devices generally require special tools to unlatch and replace the module, as it may be necessary to replace it once deployed or in case it becomes inoperable.

A large challenge in the use of snap-in modules is to have the cover equally spaced on assembly such that the gaps along the edges of the cover and the steering wheel are substantially equal. If the module snaps into position and the gaps are unequal, this is readily noticeable and very unappealing. On horn activated DAB modules, the problem can occur as the driver activates the horn, so even if the module is centered on assembly it can be shifted by sounding the horn. To overcome this, airbag modules have been made with complex designs to limit lateral movement. U.S. Pat. No. 7,398,994 B2 "A Snap-In Assembly For Retaining An Airbag Module To A Steering Wheel" discloses a retaining assembly to drive an airbag module that is moveable linearly exclusively along a path parallel to the axis of rotation of the steering wheel while providing constant horn activation loads. This retention assembly is a masterful design which limits the movement of the module exclusively in a linear direction regardless of the location on which the driver presses on the airbag cover. This prior art design, while very effective, requires a complex design.

Naturally, if the airbag module is fixed and rigidly secured to the steering wheel then the horn activation must occur differently. One way to accomplish this is to allow the horn switches to be positioned under the airbag cover and have only the cover moveable so the horn switches can be activated by depressing only the cover; these devices are often referred to as floating horns.

The assembly of the airbag module is somewhat more simplified in that the housing can be directly and rigidly affixed to the hub of the steering wheel. Nevertheless, a module that snaps into place upon assembly is preferred.

In view of above, assembly of steering wheels provided with traditional assemblies for installing airbag modules, which also are to activate the vehicle horn, is often time consuming and expensive.

The present invention also provides a retaining assembly for airbag modules, in particular a snap-in retaining assembly, which permits in-line assembly of an airbag module in a steering wheel in an easy and quick way.

It is an object of the present invention to provide a snap-in DAB module assembly, but with a much simpler design.

These and other beneficial objectives are achieved by the present invention as described herein.

SUMMARY OF THE INVENTION

The present invention has an assembly of a driver airbag module and a steering wheel. The airbag module includes a housing and a plurality of loop members extending from the housing. The steering wheel has an armature with a center or hub portion onto which the airbag module is attached. The armature has hook members, each hook member having a hook void to receive a loop. The base member has a shallow ramped surface extending upwardly to an end wall and the retaining member has a hook surface above the ramped surface and extending to the end wall. The loop member is retained in the hook void between a hook surface and a ramped surface. Each loop member is directionally deflectable. The retaining member projects from the armature and has a sloped surface for deflecting the loop member upon assembly of the airbag module to the armature directly above the hook void. The loop member is "U" shaped having a pair of extending legs and a center or connecting member, the center or connecting member occupying the hook void on assembly.

BRIEF DESCRIPTION OF THE DRAWINGS

The invention will be described by way of example and with reference to the accompanying drawings in which:

FIGS. 4 and 4a illustrate views of one of the hook members of the present invention.

FIG. 5 illustrates another view of the present invention.

DETAILED DESCRIPTION OF THE INVENTION

Figure 1:
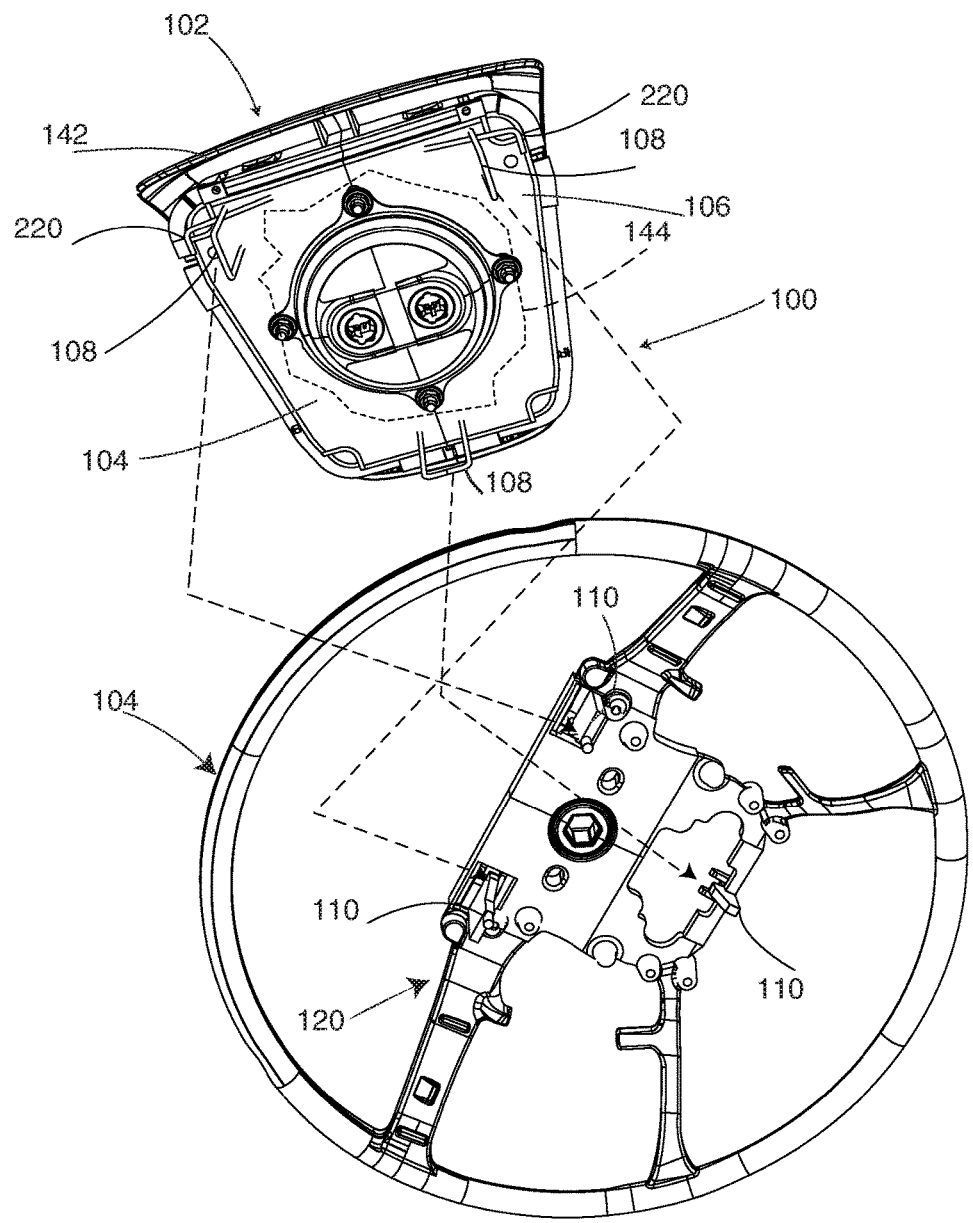
FIG. 1 shows an exploded view of the driver airbag module of the present invention and the steering wheel to which the module is attached on assembly.

FIG. 1 illustrates the major components of the present invention; more particularly an assembly 100 comprising a driver airbag module 102 and a steering wheel 104. The airbag module 102 includes a housing 106 which includes a plurality of first connecting members or loop members 108 which snap into a like plurality of second connecting members or hook members 110 formed on the center or hub portion 112 of steering wheel 104. The module 102 further includes an airbag cover 142. As will be seen from the description below, each of the first connecting members is formed as a loop while each of the second connecting members is formed as a hook.

Figure 2:
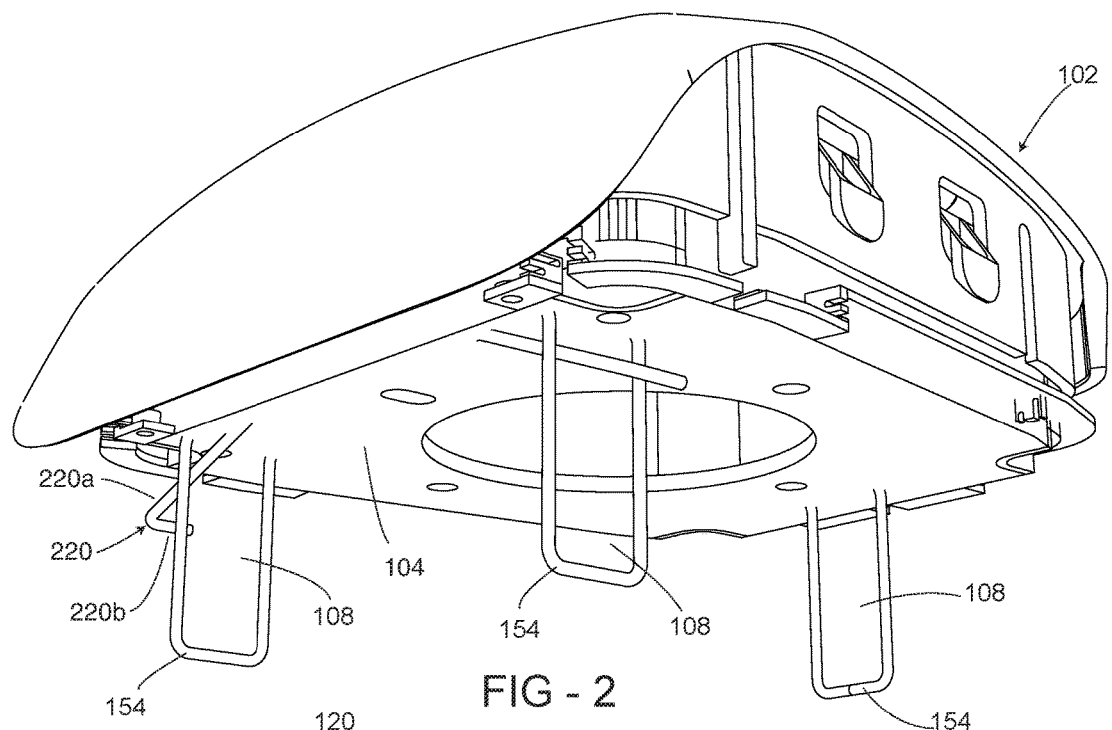
FIG. 2 shows a perspective view of the driver airbag module.
Figure 3:
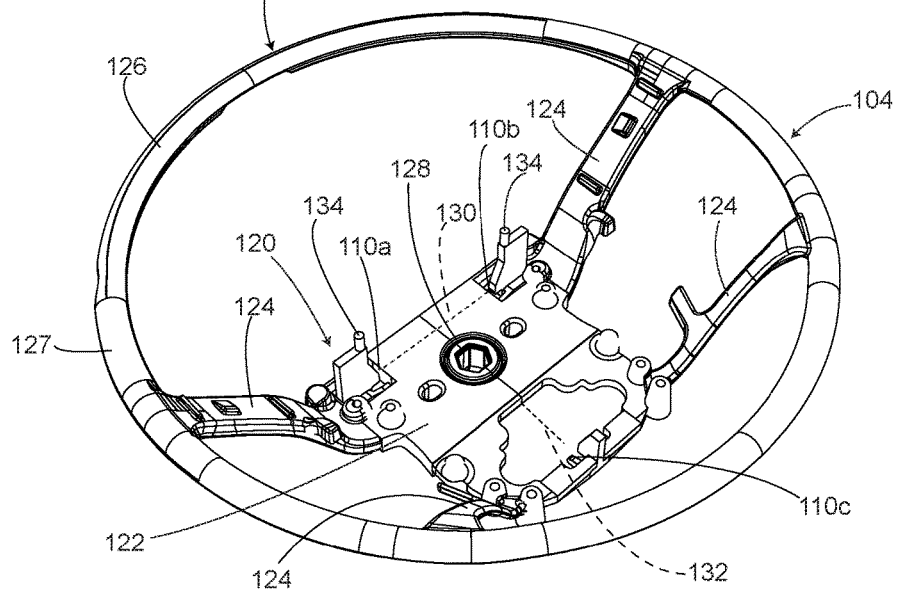
FIG. 3 shows a perspective view of the steering wheel armature.

Reference is briefly made to FIG. 2 which further illustrates the driver airbag module 102 and FIG. 3 depicts the steering wheel 104. As is known in the art, the steering wheel 104 typically comprises a skeleton 120. This skeleton is also known as an armature 120. Various portions of the armature 120 are covered by a covering material 127, such as polyurethane. The armature 120 includes a central plate or hub portion 122, a plurality of spokes 124, and a rim 126. The central plate 122 includes a connecting member 128 which is often referred to as a hub. This hub or connecting member 128 connects the steering wheel armature 120 to the vehicle's steering column (not shown). Current day armatures are made from molded magnesium or aluminum as well as polymers. A stamped armature often made of steel can also be used. Armature 120 includes a plurality of second connection members such as hook members 110a, 110b, and 110c. In the illustrated embodiment, hook members 110a and 110b lie along a line 130 with complementary hook-like features facing one another. Hook member 110c is positioned on a line 132 that is perpendicular to the line 130 and which extends through the center of hub 122. The hub portion or central plate 122 further includes two pins 134 associated with two of the hook members such as 110a and 110b. With reference to the airbag module 102 shown in FIGS. 1 and 2, a housing release spring 220 having spring legs 220a and 220b is also secured to the underside of the housing 106. The release spring 220 provides a bias force to separate the airbag module 102 from the steering wheel 104. In one embodiment each release spring 220 can be made from a separate piece of spring wire or flat spring steel and in another embodiment the release spring is integrated into wire which also forms the loop members 110.

Reference is again briefly made FIGS. 1 and 2. The driver airbag module 102 comprises a typically metal housing bottom 140 from which the first connecting members 108 extend. Located between the housing 106 and cover is an airbag 144 which is schematically illustrated in FIG. 1. In the illustrated embodiment, the first connecting member 108 is formed using a bent wire 150. The wire 150 is bent into a generally U-shape having extending legs 152a and 152b and a center or connecting member 154. Alternatively, the housing bottom 140 can be formed as a molded heavy duty plastic wherein the wire loops 108 and release springs 220 can be insert molded securely in the plastic as individual loops 108 or release springs 220. These three first connecting members 128 can be created using a single wire form 150, see FIG. 10, which includes the alternate release spring 220 as part of the wire form 150 wherein the entire wire form 150 is insert molded into the plastic housing bottom 140.

Figure 6:
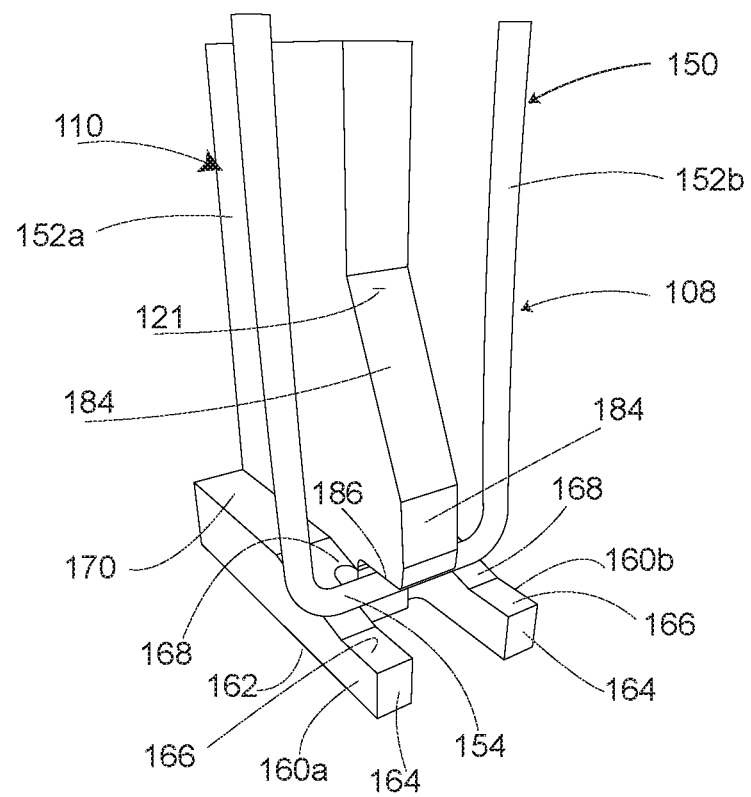
FIG. 6 shows an exemplary loop member locked into a hook member.

Reference is made to FIGS. 4 and 4a which show two embodiments of the hook members 110. FIG. 5 shows the selected loop members locked into corresponding hook members 110a or 110b. FIG. 6 shows one loop member in its hook member. In the preferred embodiment, it is envisioned the hook members 110 will be formed by a casting or molding process as part of the armature. However, the hook member can be formed as a stamping and secured to the armature. Each hook member 110 includes two base members 160a and 160b. The lower surface 162 of the hook member 110 extends from and is integral with the plate or hub 122. Each base member 160a, 160b includes an end 164, a relatively flat surface 166, and a ramped surface 168 positioned at an angle A from surface 166 and the rear surface 170. Each hook member 110 further includes a retaining member 180 which is positioned between and extends outwardly relative to each base member 160a and 160b, the retaining member includes a sloped surface 182 located at an angle B relative to a front surface 184 that is generally perpendicular to the surface 166. The retaining member 180 further includes a flat inwardly extending hook surface 186. Wall 188 is located at an inner end of surface 186 and above the ramp surface 168. The dimension of wall 188 is preferably less than or equal to the diameter of the wire used to form the loop member 108. The space between hook surfaces 186 and surface 168 forms a hook void 190 for receiving the wire loop 108.

FIG. 4a illustrates an alternative hook member 110d of the invention. The preferred embodiment includes two base members 160a, 160b which are used to facilitate molding or casting. In FIG. 4a hook member 110d can be formed sheet metal or cast as part of the hub 122 and cut or machined to form the hook void 190 and hook member retaining surfaces. In this situation only one base member 160a is needed which is integral to or is welded or otherwise attached to the hub plate 122.

Figure 9:
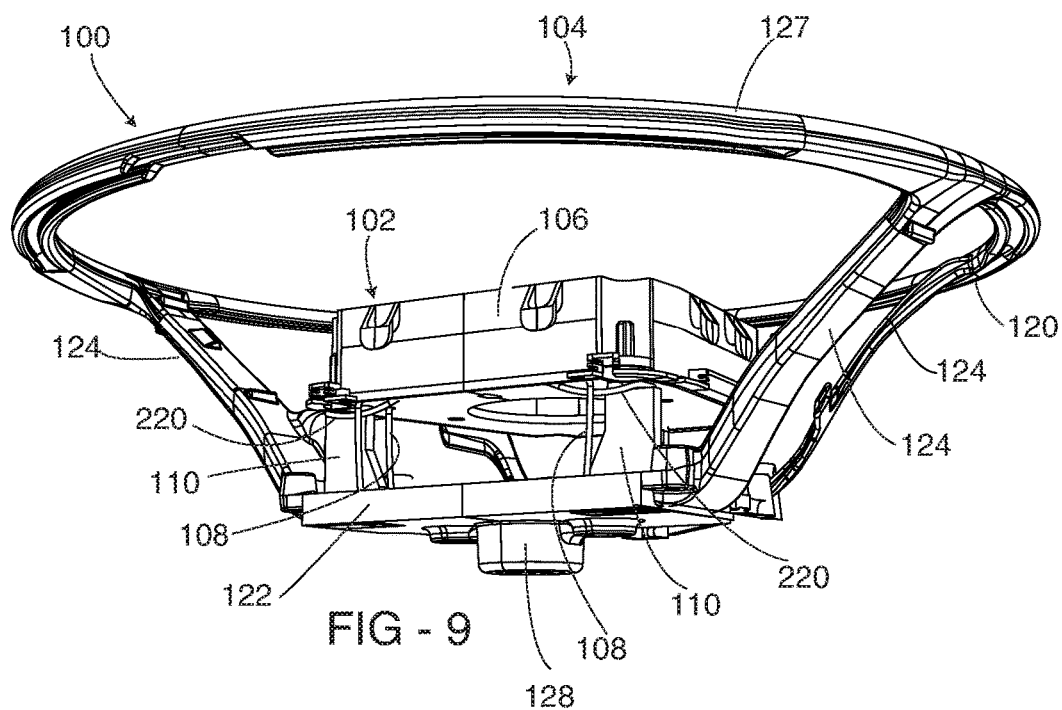
FIG. 9 shows the driver airbag module secured to a steering wheel.

Reference is again made FIG. 5 which illustrates a step in the assembly of the driver airbag module 102 to the steering wheel 104. In FIG. 5 the driver airbag module 102 has been manipulated such that each center or connecting member 154 is positioned in contact with the sloped surface 182 of the corresponding hook member 110. Numeral 121 is illustrative of this contact point. In the preferred embodiment of the invention each loop member 108 extends generally perpendicular relative to the bottom of the airbag housing 106, as shown in FIG. 7A. However, this angle is in general shown as angle C which may be in the range of 70 to 110 degrees. Further movement of the airbag module 102 in the direction of the arrow 194 causes each loop member 108 to follow the corresponding ramped surface 182 and deflect as it moves inwardly directionally along the line 130 or 132 of the hub portion 122. Further movement of the airbag module 102 along the direction of arrow 194 causes the continued movement of each loop member 108 until the connecting member 154 is positioned just below surface 186, at which time the spring loaded deflection of each loop member 108 is released and the loop member 108 will move out, see arrow 196, snapping firmly into the hook void 190 between surfaces 168 and 186, and in doing so be positioned in contact with both of these surfaces, thereby locking the airbag module to the steering wheel armature. Arrows 197, in FIG. 7, indicate how the release springs 220 become compressed as the housing is seated on the armature. These relationships are shown in FIGS. 5, 6 and 7A. On assembly, the airbag module 102 can be positioned over the armature hub so that the loops 108a and 108b contact the ramps 182 of the respective hook members 110a and 110b and as the loop 108c contacts its associated ramp 182 of hook member 110c prior to any of the connecting members 154 entering the hook void 190. In this way the loop wires 108a, 108b and 108c all help center the airbag module 102 over the hub. As downward pressure is applied all three loops 108 can snap into the hook void 190 rather simultaneously. This insures the module does not bend or lock up on assembly. FIG. 9 shows the driver airbag module 102 snapped to the steering wheel 104.

Alternatively, the loop member 108c is positioned onto the ramp 182 of its hook member 110c and then the airbag module is rotated to bring the loops 108a and 108b into contact with their respective ramps 182 on hook members 110a and 110b respectively, and then the module is aligned and pushed into locking engagement. Assuming adequate clearances exist, the loop 108c can even be positioned into the hook void 190 on the hook member 110c and then the other loops 108a and 108b brought into contact with the ramps 182. These two opposing loops 108a and 108b can then be brought into locked engagement by rotating and pushing the airbag module 102 inwardly toward the steering wheel hub. On locked engagement, the connecting member 154 of each loop 108 is wedged between the ramp surface 168 and hook surface 186.

In the preferred embodiment the angle A is chosen to be approximately equal to the friction angle defined by the material of the loop 108 and the material of the ramped surface 168. For example if the loop 108 is made of steel and the hook member 110 made of aluminum, the friction angle is approximately 31.8°.

Figure 7:
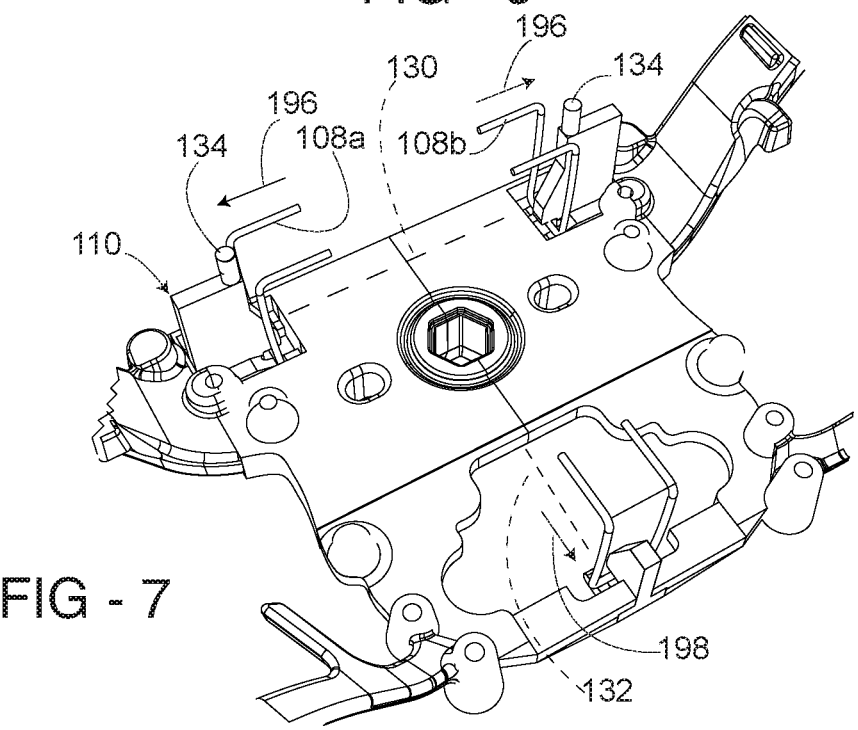
FIG. 7 diagrammatically illustrates the assembly between a single wire with locked loop members and the hook members of the steering wheel.
Figure 7A:
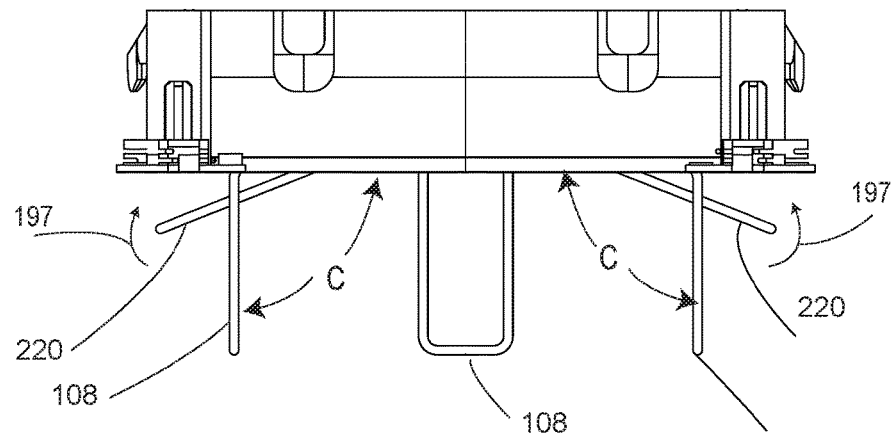
FIG. 7A shows housing release springs which function to separate the airbag module from the steering wheel.
Figure 8:
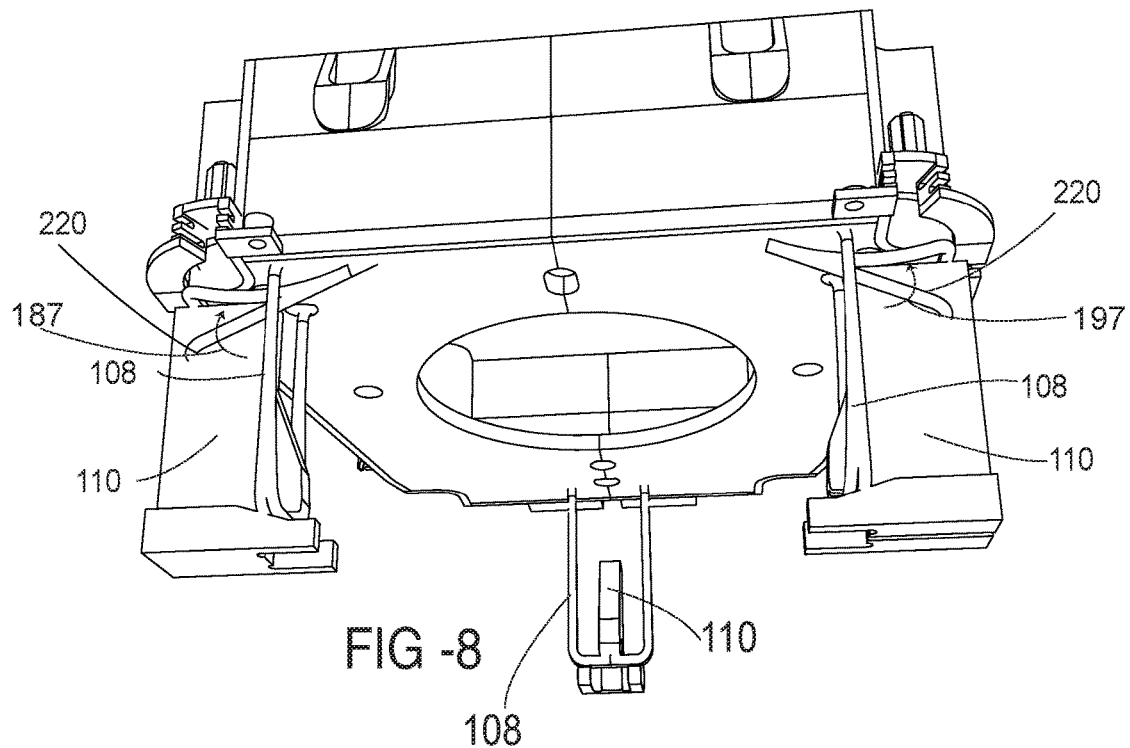
FIG. 8 is a view of a bottom surface of an airbag housing and also shows the housing release spring in a compressed condition.

Reference is briefly made to FIG. 7 which illustrates part of the armature 120 with three separate hook members 110 in interlocking engagement with three loop members 108. The loop members 108 are secured to the bottom 140 of the airbag housing 106 using flanged slotted openings or similar retaining means. Other portions of the airbag module 102 have been omitted for the purpose of illustration. In this configuration, and due to inherent springiness, loop members 108a and 108b tend to move outward toward their null position thereby generating bias forces into surfaces 168 and 186 in the directions of arrows 196, thereby stabilizing the airbag module in the direction of arrow 196 and in an opposite direction. Loop member 108c similarly generates a bias force along arrow 198. In the illustrated configuration, this configuration offers little resistance to movement of the airbag module 102 in a direction opposite arrow 198. This possible movement is prevented with the use of pins 134 which are designed to be received within complementary openings 200 and 202 formed in the bottom 140 of housing 106, see FIG. 8. As will be seen, opening 200 is generally circular while opening 202 is generally oval as illustrated in FIG. 8. Preferably, each opening 200 and 202 is sized with a slight tapered opening or, if sized to have virtually no clearance, then the pins 134 can have a rounded or spherical surface to facilitate entry into the holes 200, 202.

Figure 10:
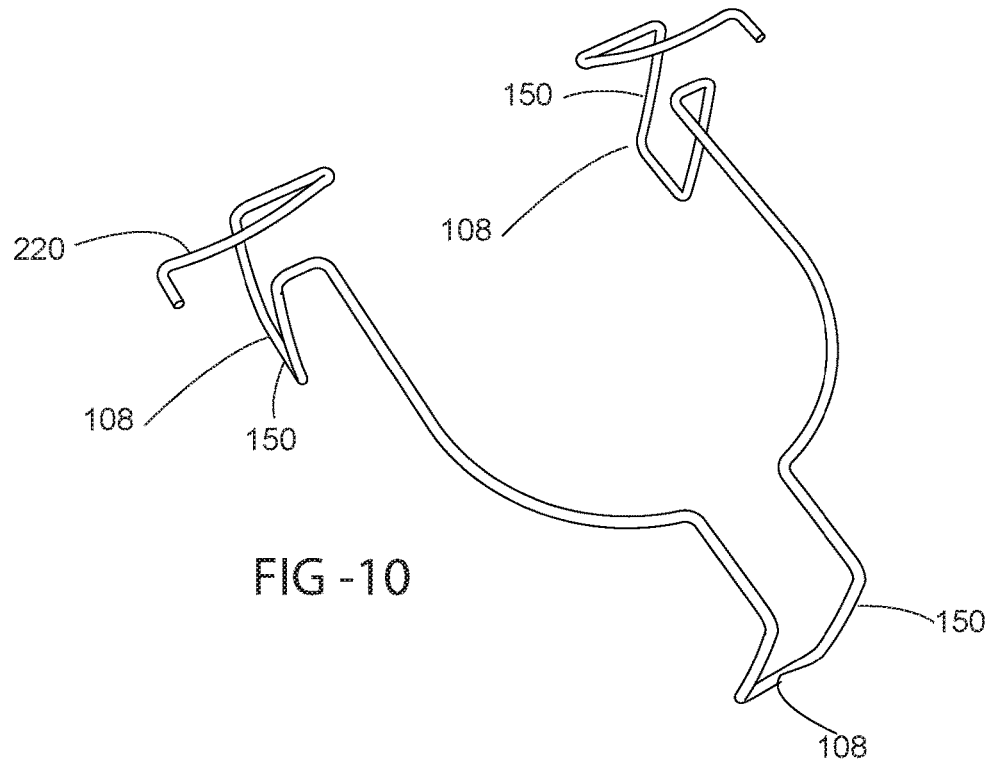
FIG. 10 is a perspective view of the loop members and release springs formed from a single wire.
Figure 11:
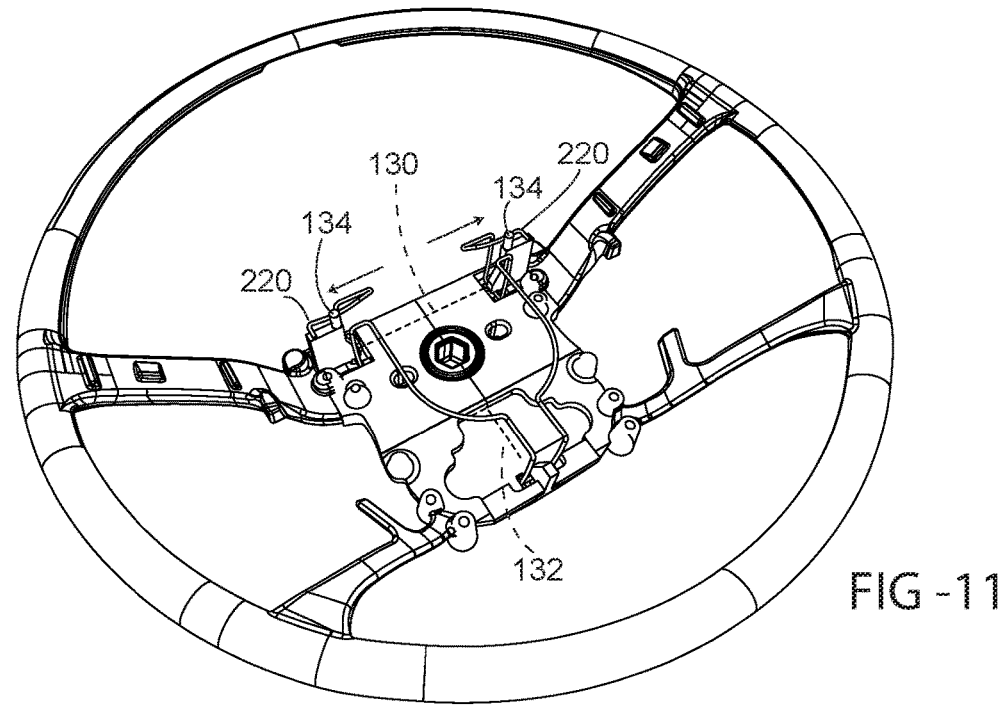
FIG. 11 is a view of the steering wheel with the release spring of FIG. 10 in place on the armature.

Reference is briefly made to FIGS. 10 and 11. FIG. 10 illustrates a wire form 210 into which the release spring 220 and each of the individual loop members 108 are formed as a unit. In this embodiment wire form 210 is connected to the airbag housing 106 with slotted openings into which the wire is held around the wire 210 perimeter. FIG. 11 diagrammatically shows how the loops 108 of wire form 210 are secured to the armature and more particularly to each of the hook members 110. Additionally the release spring 220 is shown resting on the top surface 189 of two of the hook members 110a and 110b.

Figure 12:
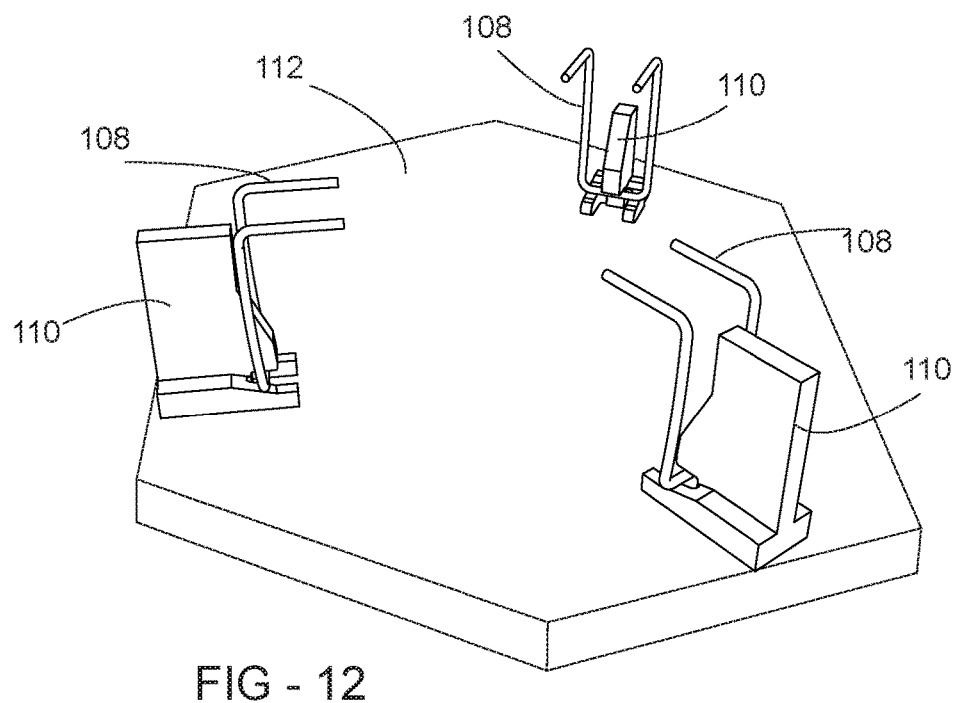
FIG. 12 shows an alternate embodiment of the invention.

Reference is briefly made to FIG. 12 which shows another embodiment using 3 hook members 110 equally spaced from the center of the hub 128 and equally spaced from one another at an angle of 120 degrees relative to each other. In this embodiment the pins 134 are not needed due to the opposing angularity of the other two hook members 110 as no sideways or lateral movement of the airbag relative to the armature 120 is possible as it is opposed by the two opposing hook members. In the first embodiment, the hook member 110c has no resistance to an inward or sideways movement. In this alternative embodiment each hook member 110 has two opposing hook members 110 blocking this inward movement.

Many changes and modifications in the above-described embodiment of the invention can, of course, be carried out without departing from the scope thereof. Accordingly, that scope is intended to be limited only by the scope of the appended claims.

What is claimed is:

1. An assembly of a driver airbag module (102) and a steering wheel (104) comprising:
   an airbag module having a housing (106) and a plurality of loop members (108) extending from the housing, each loop member being directionally deflectable;
   a steering wheel having an armature (120) with a center or hub portion (122) onto which the airbag module is attached, the armature having hook members (110), each hook member having a hook void (190), the hook void being defined by a space above one or two base members (160a, b) and below retaining member (180), the base member having a shallow ramped surface (182) extending upwardly to an end wall (188) and the retaining member having a hook surface (186) above the ramped surface and extending to the end wall; and
   wherein the loop member (108) is retained in the hook void (190) between the hook surface (186) and the ramped surface (168).

2. The assembly of claim 1 wherein the retaining member (180) projects from the armature (120) and has a sloped surface (182) for deflecting the loop member (108) upon assembly of the airbag module (102) to the armature (120) directly above the hook void (190).

3. The assembly of claim 2 wherein the loop member is "U" shaped having a pair of extending legs (152a, b) and a center or connecting member (154), the center or connecting member occupying the hook void (190) on assembly.

4. The assembly of claim 1 wherein the hook members (110) include hook members (110a) and (110b) lying along a line (130) with complementary hook-like features facing one another, and further includes hook member (110c) positioned on a line (132) that is perpendicular to the line (130) and which extends through the center of hub (122).

5. The assembly of claim 4 wherein the hub portion or central plate (122) further includes two pins (134) associated with two of the hook members (110a, 110b).

6. The assembly of claim 1 wherein the airbag module (102) further comprises, a housing release spring (220) having spring legs (220a and 220b), the spring (220), being secured to the underside of the housing (106), provides a bias force to separate the airbag module (102) from the steering wheel (104).

7. The assembly of claim 6 wherein each release spring (220) is made from a separate piece of spring wire or flat spring steel.

8. The assembly of claim 6 wherein the release spring (220) is integrated into wire which also forms the loop members (110).

9. The assembly of claim 1 wherein the driver airbag module (102) further comprises a housing bottom (140) from which the loop members (108) extend.

10. The assembly of claim 1 wherein the loop member (108) is formed using a bent wire (150).

11. The assembly of claim 10 wherein the wire (150) is bent into a generally U-shape having extending legs (152a and 152b) and a center or connecting member (154).

12. The assembly of claim 9 wherein the housing bottom (140) is formed as a molded heavy duty plastic and wherein the wire loops (108) and release springs (220) are insert molded securely in the plastic as individual loops (108) or release springs (220).

13. The assembly of claim 1 wherein the hook members (110) will be formed by a casting or molding process as part of the armature.

14. The assembly of claim 1 wherein the hook members (110) are formed as a stamping and secured to the armature.

15. The assembly of claim 1 wherein each hook member (110) includes two base members (160a and 160b) and a lower surface (162) of the hook member (110) extends from and is integral with the plate or hub (122).

16. The assembly of claim 15 wherein each base member (160a, 160b) includes an end (164), a relatively flat surface (166), and a ramped surface (168) positioned at an angle A from the flat surface (166) and a rear surface (170).

17. The assembly of claim 1 wherein the retaining member (180) further includes a flat inwardly extending hook surface (186) and a wall (188) is located at an inner end of hook surface (186) and above the ramp surface (168), the dimension of wall (188) is less than or equal to the diameter of a wire used to form the loop member (108), the space between hook surfaces (186) and surface (168) forms the hook void (190) for receiving the loop member (108).

18. The assembly of claim 6 wherein each loop member (108) extends at an angle C relative to the bottom of the airbag housing (106), the angle C is in the range of 70 to 110 degrees.

19. The assembly of claim 4 wherein movement of the airbag module (102) causes each loop member (108) to follow the corresponding ramped surface (182) and deflect as it moves inwardly directionally along the line (130 or 132) of the hub portion (122) and further movement of the airbag module (102) along the same direction causes the continued movement of each loop member (108) until the connecting member (154) is positioned just below surface (186), at which time the spring loaded deflection of each loop member (108) is released and the loop member (108) will move out, snapping firmly into the hook void (190) between surfaces (168 and 186), and in doing so be positioned in contact with both of these surfaces, thereby locking the airbag module to the steering wheel armature.

20. The assembly of claim 5 wherein off-center movement of the airbag module (102) is prevented by the pins (134) which are designed to be received within complementary openings (200 and 202) formed in a bottom (140) of housing (106).

* * * * *